US012468878B2

(12) United States Patent
Maschmeyer et al.

(10) Patent No.: US 12,468,878 B2
(45) Date of Patent: Nov. 11, 2025

(54) METHODS AND SYSTEMS FOR GENERATION OF TEXT USING LARGE LANGUAGE MODEL WITH INDICATIONS OF UNSUBSTANTIATED INFORMATION

(71) Applicant: Shopify Inc., Ottawa (CA)

(72) Inventors: Russ Maschmeyer, Berkeley, CA (US); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 310 days.

(21) Appl. No.: 18/180,518

(22) Filed: Mar. 8, 2023

(65) Prior Publication Data

US 2024/0256764 A1 Aug. 1, 2024

Related U.S. Application Data

(60) Provisional application No. 63/483,668, filed on Feb. 7, 2023, provisional application No. 63/482,399, filed on Jan. 31, 2023.

(51) Int. Cl.
*G06F 40/169* (2020.01)
*G06F 16/332* (2019.01)
*G06F 40/205* (2020.01)
*G06F 40/40* (2020.01)

(52) U.S. Cl.
CPC ........ *G06F 40/169* (2020.01); *G06F 16/3328* (2019.01); *G06F 40/205* (2020.01); *G06F 40/40* (2020.01)

(58) Field of Classification Search
CPC .. G06F 40/169; G06F 16/3328; G06F 40/205; G06F 40/40
See application file for complete search history.

(56) References Cited

U.S. PATENT DOCUMENTS

| | | | |
|---|---|---|---|
| 11,769,017 B1* | 9/2023 | Gray | G06F 40/56 704/9 |
| 2023/0334263 A1* | 10/2023 | Konam | G16H 10/20 |
| 2023/0394855 A1* | 12/2023 | Xie | G06F 40/40 |
| 2024/0161520 A1* | 5/2024 | Li | G06N 3/08 |

(Continued)

OTHER PUBLICATIONS

Liu, Tianyu, et al. "A token-level reference-free hallucination detection benchmark for free-form text generation." arXiv preprint arXiv:2104.08704 (2021). (Year: 2021).*

(Continued)

*Primary Examiner* — Douglas Godbold
(74) *Attorney, Agent, or Firm* — Smart & Biggar LP

(57) ABSTRACT

Methods and systems for prompting a large language model (LLM) to generate a description of an object with indications of any unsubstantiated information are disclosed. A prompt is generated to a LLM to generate a description of an object, where the prompt includes one or more object attributes to include in the generated description. The prompt also includes an instruction for the LLM to annotate any portions of the generated description that are, involve, and/or include unsubstantiated information according to a defined format. The prompt is provided to the LLM and the generated description is received. The generated description is parsed to identify, based on the defined format, one or more annotated portions indicating unsubstantiated information. The generated description is presented for display via a user device.

24 Claims, 10 Drawing Sheets

(56) References Cited

U.S. PATENT DOCUMENTS

| | | | | |
|---|---|---|---|---|
| 2024/0242037 A1* | 7/2024 | Heller | ............................ | G06F 40/35 |
| 2024/0242040 A1* | 7/2024 | Cogswell | ..................... | G06F 40/40 |
| 2024/0296295 A1* | 9/2024 | Russell | ........................ | G06F 40/56 |
| 2024/0419912 A1* | 12/2024 | Somech | ....................... | G06F 40/279 |
| 2025/0005266 A1* | 1/2025 | Bax | ................................ | G06F 16/35 |

OTHER PUBLICATIONS

Newman, Benjamin, Prafulla Kumar Choubey, and Nazneen Rajani. "P-adapters: Robustly extracting factual information from language models with diverse prompts." arXiv preprint arXiv:2110.07280 (2021). (Year: 2021).*

Chen, Canyu, and Kai Shu. "Can llm-generated misinformation be detected?." arXiv preprint arXiv:2309.13788 (2023). (Year: 2023).*

Biten, Ali Furkan, Lluís Gómez, and Dimosthenis Karatzas. "Let there be a clock on the beach: Reducing object hallucination in image captioning." Proceedings of the IEEE/CVF Winter Conference on Applications of Computer Vision. 2022. (Year: 2022).*

* cited by examiner

FIG. 6

METHODS AND SYSTEMS FOR GENERATION OF TEXT USING LARGE LANGUAGE MODEL WITH INDICATIONS OF UNSUBSTANTIATED INFORMATION

CROSS-REFERENCE TO RELATED APPLICATIONS

The present disclosure claims priority from U.S. provisional patent No. 63/483,668, filed Feb. 7, 2023, entitled "METHODS AND SYSTEMS FOR GENERATION OF TEXT USING LARGE LANGUAGE MODEL WITH INDICATIONS OF UNSUBSTANTIATED INFORMATION; and U.S. provisional patent No. 63/482,399, filed Jan. 31, 2023, entitled "METHODS AND SYSTEMS FOR GENERATION OF TEXT USING LARGE LANGUAGE MODEL WITH INDICATIONS OF ABSENT INFORMATION", the entireties of which are all hereby incorporated by reference.

FIELD

The present disclosure relates to machine learning, and, more particularly, to generation of prompts to large language models (LLM), and, yet more particularly, to prompting an LLM to include indications of unsubstantiated information in the generated text that can be parsed.

BACKGROUND

A large language model (LLM) is a type of machine learning (ML) model that is capable of generating text output, including natural language text output. A LLM may be provided with a prompt, which may be a natural language instruction that instructs the LLM to generate a desired output, including natural language text or other generative output in various desired formats.

SUMMARY

Large language model (LLM)-based services for generating text, in general, may generate an output (e.g., text) that is factually incorrect or otherwise unsubstantiable (sometimes referred to as the "hallucination" phenomenon).

A human user may not realize that the generated text contains errors (e.g., the user has not read the text closely or the user does not have access to the facts necessary to identify the errors). Additionally, it may not be practical for a human to closely review every word of a LLM-generated text for potential errors, particularly if the LLM is being used to generate a large number of text outputs.

Conventionally, to generate a description of an object (e.g., a location, an image, a video, a piece of music, a tangible thing, etc.), a user may prompt a LLM to generate an object description. The prompt to the LLM may be simply a list of the object attributes including the object name and optionally other attributes. The prompt may then be inputted into the LLM and the generated text may be directly outputted to the user from the LLM. However, the generated text from the LLM may include text that the LLM is not able to justify or substantiate.

In various examples, the present disclosure provides a technical solution that generates a prompt to cause the LLM to annotate (according to a defined format) any portions of the generated text that were generated with unsubstantiated information. In this way, text that could benefit from human attention can be automatically identified. The LLM is prompted with instructions to annotate the generated text using a defined annotation syntax that can be parsed by a parser, in order to automate or simplify the review process. This reduces the quantity of text that requires close review by a human and reduces the risk of an error being inadvertently missed.

In some examples, the present disclosure provides an automated parser and a user interface (UI) that processes the generated text from the LLM. The UI may provide a convenient way for a user to supply input where there is unsubstantiated information in the generated text, and may enable more efficient user interactions than simply providing a block of editable text. Additionally, the UI may ensure that a user has reviewed/confirmed the generated text before the text is published.

In some examples, the unsubstantiated information in the generated text may be automatically or semi-automatically indicated, completed, substantiated, supplemented, and/or otherwise provided by the disclosed systems and methods. For example, information about an object may be queried and retrieved from an object database to complete or otherwise provide information in place of and/or in addition to the unsubstantiated information (e.g., to complete, substantiate or supplement the unsubstantiated information) in an object description generated by the LLM. This may enable a complete and accurate object description to be automatically or semi-automatically generated, with little or no user input required and with reduced risk of inaccurate information being inadvertently introduced into the object description by the LLM.

In an example aspect, the present disclosure describes a system comprising a processing unit configured to execute computer-readable instructions to cause the system to: generate a prompt to a large language model (LLM) to generate a description of an object, the prompt including one or more object attributes to include in the generated description, and also including an instruction for the LLM to annotate, according to a defined format, any portions of the generated description that include unsubstantiated information; provide the prompt to the LLM and receive the generated description; parse the generated description to identify, based on the defined format, one or more annotated portions indicating unsubstantiated information; and present the generated description for display via a user device.

In an example of the preceding example system, the generated description may be presented in a user interface (UI) in which at least one of the identified one or more annotated portions is modifiable.

In an example of the preceding example system, the processing unit may be configured to execute computer-readable instructions to further cause the system to, prior to presenting the UI: identify, for a given one annotated portion in the generated description, an unsubstantiated object attribute; query a database to search for the unsubstantiated object attribute; modify the generated description by replacing the given one annotated portion with a found object attribute received in a response to the query; and present the modified generated description in the UI.

In an example of the preceding example system, there may be a plurality of found object attributes received in the response to the query, and the generated description may be modified by replacing the given one annotated portion with a UI element for selecting one of the plurality of found object attributes.

In an example of some of the preceding example systems, the UI further may include an input field for receiving user input to edit the one or more annotated portions.

In an example of the preceding example system, the processing unit may be configured to execute computer-readable instructions to further cause the system to: identify at least two annotated portions in the generated description requiring a same user input; provide one input field for receiving user input to edit the at least two annotated portions; and update the at least two annotated portions with information inputted in the one input field.

In an example of any of the preceding example systems, the prompt to the LLM may include at least one example of an annotation according to the defined format.

In an example of the preceding example system, the at least one example may be generated by: retrieving, from a database of the system, an example object description and a set of example object attributes for an example object; modifying the example object description by replacing one selected example object attribute in the example object description with an annotation in accordance with the defined format; modifying the set of example object attributes by removing the one selected example object attribute; and generating the at least one example to include the modified set of example object attributes and the modified example object description.

In an example of any of the preceding example systems, the processing unit may be configured to execute computer-readable instructions to further cause the system to provide the prompt to the LLM as a set of tokens.

In an example of any of the preceding example systems, the LLM may be a trained generative LLM.

In an example of any of the preceding example systems, the prompt to the LLM may include instructions to generate a product description for a product, and the generated description may be the generated product description.

In an example of the preceding example system, the generated product description may be used to update a product page related to the product.

In an example of the preceding example system, the generated product description may be used to update the product page related to the product responsive to an approval received from a user device.

In another example aspect, the present disclosure describes a method including: generating a prompt to a large language model (LLM) to generate a description of an object, the prompt including one or more object attributes to include in the generated description, and also including an instruction for the LLM to annotate, according to a defined format, any portions of the generated description that include unsubstantiated information; providing the prompt to the LLM and receiving the generated description; parsing the generated description to identify, based on the defined format, one or more annotated portions indicating unsubstantiated information; and presenting the generated description for display via a user device.

In an example of the preceding example method, the generated description may be presented in a user interface (UI) in which at least one of the identified one or more annotated portions is modifiable.

In an example of the preceding example method, the method may include, prior to presenting the UI: identifying, for a given one annotated portion in the generated description, an unsubstantiated object attribute; querying a database to search for the unsubstantiated object attribute; modifying the generated description by replacing the given one annotated portion with a found object attribute received in a response to the query; and presenting the modified generated description in the UI.

In an example of the preceding example method, there may be a plurality of found object attributes received in the response to the query, and the generated description may be modified by replacing the given one annotated portion with a UI element for selecting one of the plurality of found object attributes.

In an example of some of the preceding example methods, the UI further may include an input field for receiving user input to edit the one or more annotated portions.

In an example of the preceding example method, the method may include: identifying at least two annotated portions in the generated description requiring a same user input; providing one input field for receiving user input to edit the at least two annotated portions; and updating the at least two annotated portions with information inputted in the one input field.

In an example of any of the preceding example methods, the prompt to the LLM may include at least one example of an annotation according to the defined format.

In an example of the preceding example method, the at least one example may be generated by: retrieving, from a database, an example object description and a set of example object attributes for an example object; modifying the example object description by replacing one selected example object attribute in the example object description with an annotation in accordance with the defined format; modifying the set of example object attributes by removing the one selected example object attribute; and generating the at least one example to include the modified set of example object attributes and the modified example object description.

In an example of any of the preceding example methods, the method may include providing the prompt to the LLM as a set of tokens.

In an example of any of the preceding example methods, the LLM may be a trained generative LLM.

In an example of any of the preceding example methods, the prompt to the LLM may include instructions to generate a product description for a product, and the generated description may be the generated product description.

In an example of the preceding example method, the generated product description may be used to update a product page related to the product.

In an example of the preceding example method, the generated product description may be used to update the product page related to the product responsive to an approval received from a user device.

In another example aspect, the present disclosure describes a non-transitory computer readable medium storing computer-executable instructions thereon, wherein the instructions are executable by a processing unit of a system to cause the system to: generate a prompt to a large language model (LLM) to generate a description of an object, the prompt including one or more object attributes to include in the generated description, and also including an instruction for the LLM to annotate, according to a defined format, any portions of the generated description that include unsubstantiated information; provide the prompt to the LLM and receive the generated description; parse the generated description to identify, based on the defined format, one or more annotated portions indicating unsubstantiated information; and present the generated description for display via a user device.

In an example of the preceding example non-transitory computer readable medium, the generated description may be presented in a user interface (UI) in which at least one of the identified one or more annotated portions is modifiable.

In an example of the preceding example non-transitory computer readable medium, the instructions may be executable by the processing unit to further cause the system to, prior to presenting the UI: identify, for a given one annotated portion in the generated description, an unsubstantiated object attribute; query a database to search for the unsubstantiated object attribute; modify the generated description by replacing the given one annotated portion with a found object attribute received in a response to the query; and present the modified generated description in the UI.

In an example of the preceding example non-transitory computer readable medium, there may be a plurality of found object attributes received in the response to the query, and the generated description may be modified by replacing the given one annotated portion with a UI element for selecting one of the plurality of found object attributes.

In an example of some of the preceding example non-transitory computer readable media, the UI further may include an input field for receiving user input to edit the one or more annotated portions.

In an example of the preceding example non-transitory computer readable medium, the instructions may be executable by the processing unit to further cause the system to: identify at least two annotated portions in the generated description requiring a same user input; provide one input field for receiving user input to edit the at least two annotated portions; and update the at least two annotated portions with information inputted in the one input field.

In an example of any of the preceding example non-transitory computer readable media, the prompt to the LLM includes at least one example of an annotation according to the defined format.

In an example of the preceding example non-transitory computer readable medium, the at least one example may be generated by: retrieving, from a database of the system, an example object description and a set of example object attributes for an example object; modifying the example object description by replacing one selected example object attribute in the example object description with an annotation in accordance with the defined format; modifying the set of example object attributes by removing the one selected example object attribute; and generating the at least one example to include the modified set of example object attributes and the modified example object description.

In an example of any of the preceding example non-transitory computer readable media, the instructions may be executable by the processing unit to further cause the system to provide the prompt to the LLM as a set of tokens.

In an example of any of the preceding example non-transitory computer readable media, the LLM may be a trained generative LLM.

In an example of any of the preceding example non-transitory computer readable media, the prompt to the LLM may include instructions to generate a product description for a product, and the generated description may be the generated product description.

In an example of the preceding example non-transitory computer readable medium, the generated product description may be used to update a product page related to the product.

In an example of the preceding example non-transitory computer readable medium, the generated product description may be used to update the product page related to the product responsive to an approval received from a user device.

BRIEF DESCRIPTION OF THE DRAWINGS

Reference will now be made, by way of example, to the accompanying drawings which show example embodiments of the present application, and in which:

FIG. 6 is an example homepage of an administrator, which may be accessed via the e-commerce platform of FIG. 5.

Similar reference numerals may have been used in different figures to denote similar components.

DETAILED DESCRIPTION

Figure 1A:
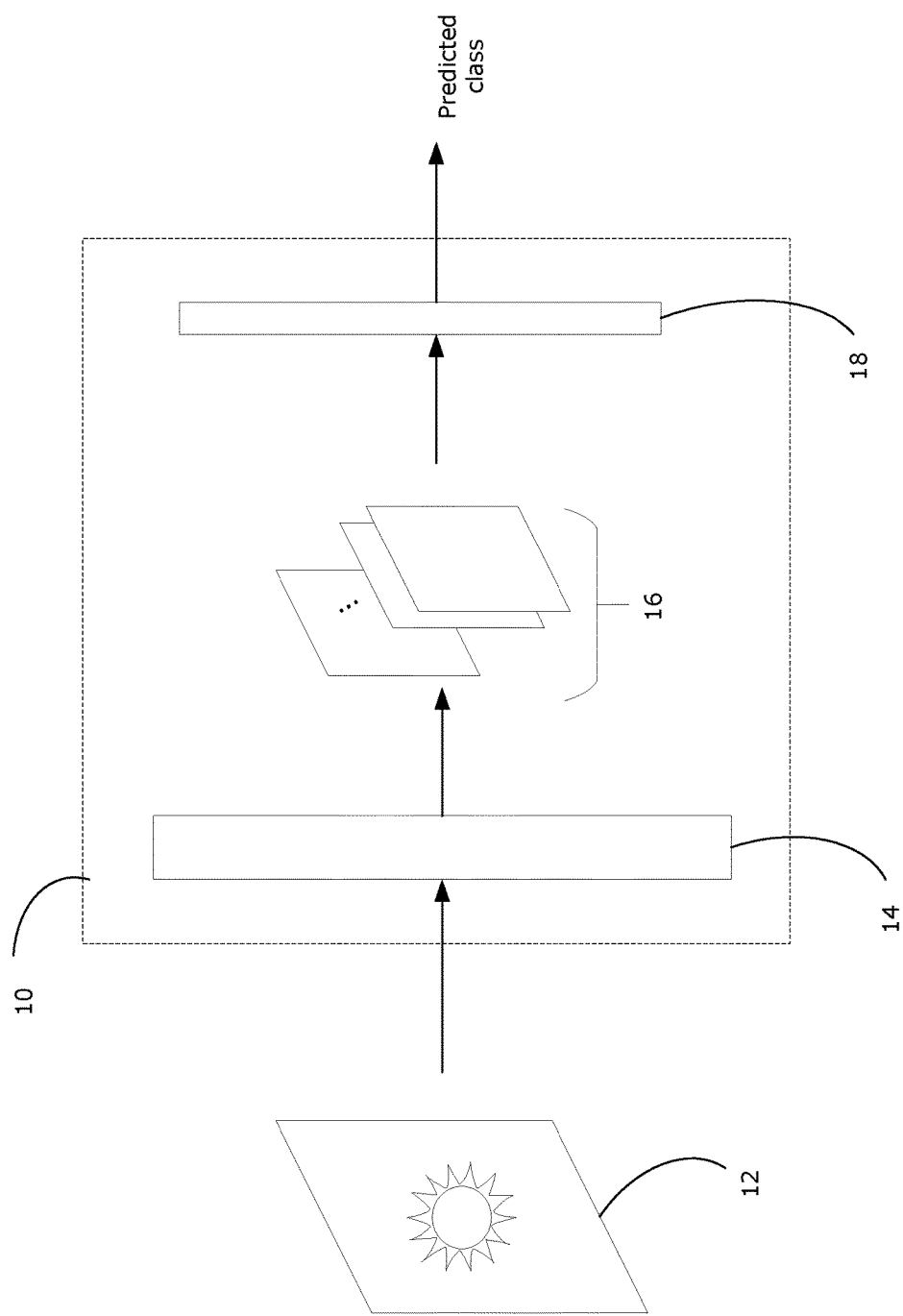
FIG. 1A is a block diagram of a simplified convolutional neural network, which may be used in examples of the present disclosure.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
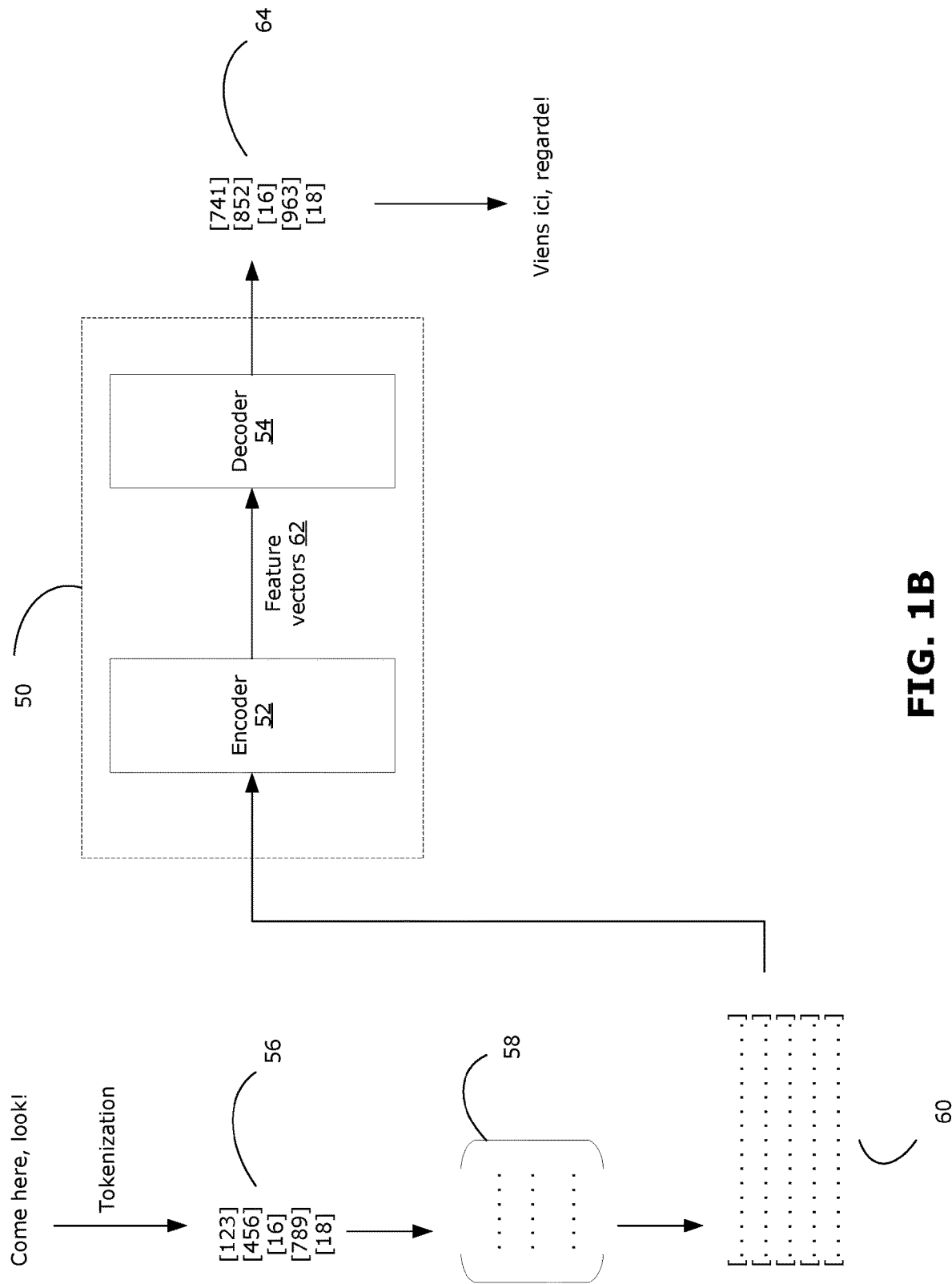
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
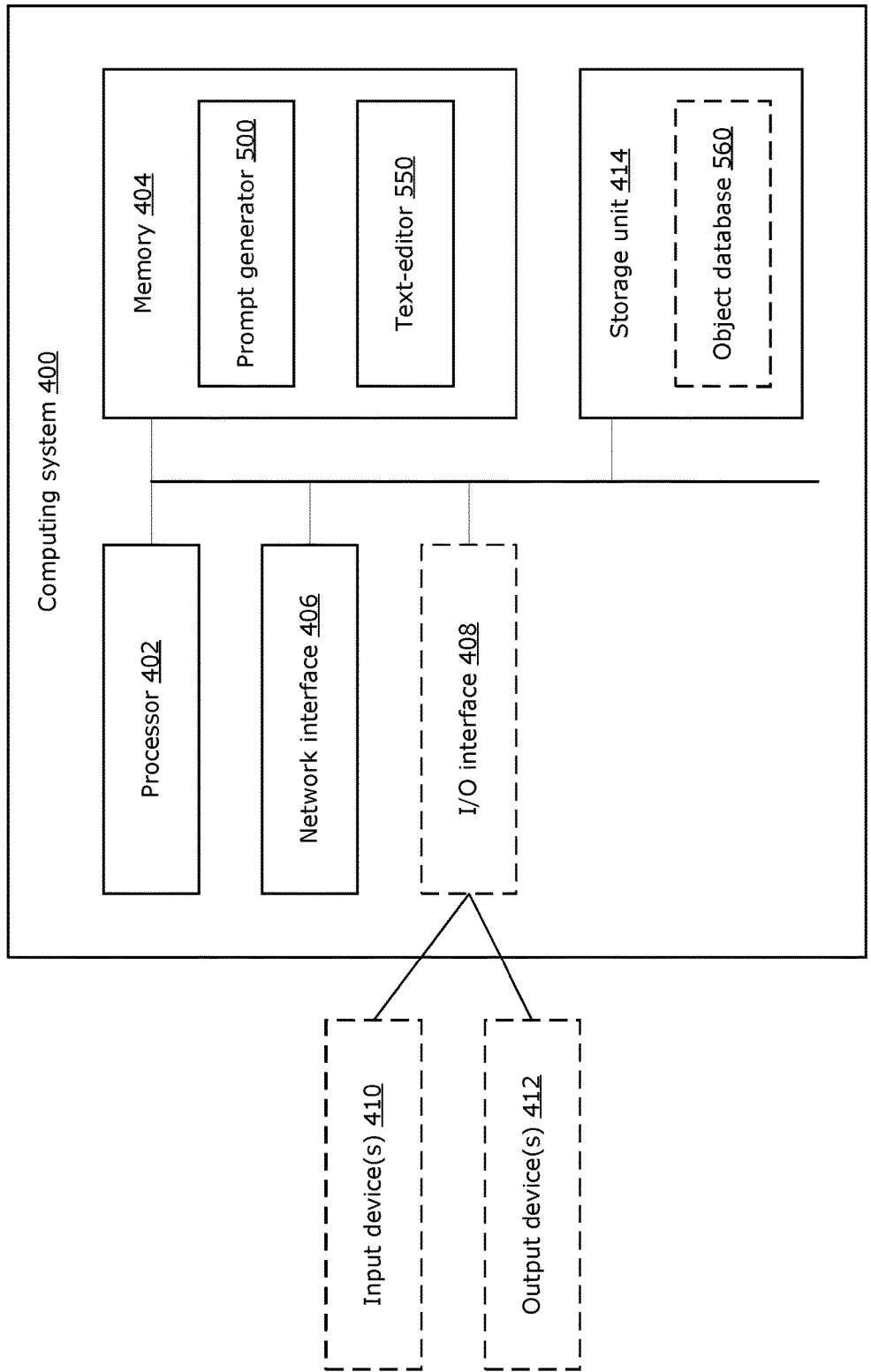
FIG. 2 is a block diagram of an example computing system, which may be used to implement examples of the present disclosure.

FIG. 2 illustrates an example computing system 400, which may be used to implement examples of the present disclosure, such as a prompt generation engine to generate prompts to be provided as input to a language model such as a LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

In the example of FIG. 2, the computing system 400 may store in the memory 404 computer-executable instructions, which may be executed by a processing unit such as the processor 402, to implement one or more embodiments disclosed herein. For example, the memory 404 may store instructions for implementing prompt generator 500 and/or text-editor 550 applications. In some examples, the computing system 400 may be a server of an online platform that provides the prompt generator 500 and text-editor 550 as web-based or cloud-based services that may be accessible by a user device (e.g., via communications over a wireless network). In some examples, the computing system 400 may be a user device that provides the text-editor 550 as a software application while another embodiment of the computing system 400 may be a server of the online platform that provides the prompt generator 500. Other such variations may be possible without departing from the subject matter of the present application.

In the example shown, the computing system 400 may store, in the storage unit 414, an optional object database 560 storing data about a plurality of objects. For example, the object database 560 may include, for each object, data about one or more object attributes (e.g., object name, object size, object type, object features, etc.). Object attribute(s) for a given object may for example, be stored in a lookup table that can be referenced using the name of the object, a unique identifier (e.g., identification number) of the object, etc. Each object attribute of a given object may be stored as a text string (which may include one or more words). It should be noted that the object database 560 may store other data related to each object, such as an image of the object, a user or account associated with the object, etc.

The data stored in the object database 560 may be labeled by category. It may be noted that the stored data may be unstructured. Additionally, instead of being labeled by category, the data may be labeled by fields or types. For example, each object may have at least an object attribute in the category [object name]. Additional object attributes may include attributes in categories such as [color], [owner], [size], etc. As an example, the object database 560 may store the following object attributes related to a chair: [object name] "ergonomic chair", [color] "black", [material] "leather".

The object database 560 may be queried by, for example, the prompt generator 500 and/or the text-editor 550, as discussed further below. In some examples, the object database 560 may not be stored locally on the computing system 400 but may instead be a remote database accessible by the computing system 400 (e.g., via a wired or wireless communication link, for example using the network interface 406).

In various examples, the present disclosure provides methods and systems for prompting a LLM to generate a text, such as an object description, in which any portions of the text that were generated with unsubstantiated information are annotated according to a defined format. The generated text may be parsed, based on the defined format, to identify any text portions that are, involve, and/or include unsubstantiated information. This may enable computer-assisted completion of the generated text using accurate information and may avoid the inadvertent inclusion of inaccurate information in the generated text.

To assist in understanding the present disclosure, the hallucination phenomenon is first discussed. In ML-based models (including LLMs), the term hallucination may refer to output that is generated by the trained model that appears to be correct for the task (e.g., fits expected sentence structure and rules of grammar, in the case of a text generation task) but that is actually not justified or substantiated by the training data (or by data otherwise input into or available to the LLM). The present disclosure addresses this problem in the context of LLMs, however it should be understood that examples disclosed herein may be used to address the challenge of hallucination in other types of ML-based models.

There may be different reasons why a LLM generates text with unjustified or unsubstantiated information. For example, a LLM may be trained to generate an optimal output, based on the instructions in the prompt, and to generate the output the LLM may need to include information in the generated output that the LLM does not have. The present disclosure refers to the challenge that a LLM may generate text with missing information or unsubstantiated information. Missing information may refer specifically to information that is expected to be in the generated text but cannot be justified or substantiated by the LLM, whereas unsubstantiated information may refer more generally to information that the LLM could include in generated text but is unable to justify or substantiate—that is, information that may not be substantiated or known by the LLM in view of the input to the LLM (e.g., the prompt), the LLM's training data, and/or state information (if any) maintained by the LLM (e.g., for a session therewith, where a session includes, e.g., a sequence of related inputs and outputs to the LLM). In a particular example, if the LLM is prompted with "When was Albert Einstein born?", the generated text is expected to contain the birth date of Albert Einstein; if the birth date information cannot be justified or substantiated by the LLM based on its training data (or based on data otherwise input into or available to the LLM), then that information is missing. On the other hand, if the LLM is prompted with "Tell me about Albert Einstein", the generated text may not be expected to include the birth date of Albert Einstein; and the birth date information may be considered "unsubstantiated information" if the LLM cannot justify or substantiate any statement involving said birth date. However, the LLM may nevertheless generate text that is, involves, and/or includes unsubstantiated information—for example, the LLM may generate text asserting that the birth date of Albert Einstein is the filing date of this application while being unable to justify or substantiate such an assertion.

The problem of an LLM-generated text with and/or involving unsubstantiated information may occur when a LLM is prompted to generate a text according to certain learned patterns and relationships but the information required to generate the desired text is not provided or otherwise available to the LLM. The LLM may generate a complete text even when the information required to complete the text is unsubstantiated. For example, if the LLM is prompted to "Write a story about John and Mary at a wedding", the LLM may generate a text in which John and Mary are the groom and bride at the wedding, even though information about John and Mary's relationship to each other cannot be substantiated. The LLM may do this because the LLM has learned (e.g., from training on a large corpus) that a story about a wedding should have a groom and bride. In this case, the LLM generates the text according to a learned pattern, even though the LLM has no information of John and Mary being married to each other (or being a "groom" and a "bride", respectively). In other words, the LLM has generated text with and/or involving unsubstantiated information—that is, the text is generated through learned patterns and relationships of a general nature, but not involving specific patterns or relationships being known or incorporated in (or otherwise inputted into) the LLM.

A user may wish to generate a text output, such as a description for an object that has a set of object attributes (where one of the object attributes may be a name or classification of the object). In accordance with examples of the present disclosure, a computing system may be a server of an online platform (e.g., SaaS platform) that may provide services to a user device of the user (e.g., over a wireless network) to enable the user to access LLM services for generation of an object description. The platform may for example, obtain a set of object attributes (which may be explicitly inputted by the user or may be automatically extracted from a database (e.g., the object database 560)) and may use the prompt generator 500 to generate a prompt. The prompt may be provided to a LLM (e.g., via an API call to a remote LLM) and the generated description may be received from the LLM. The platform may then present the generated description for display on the user device. Optionally, the platform may use the text-editor 550 or other parser to process the generated description prior to presentation, as discussed further below.

In the present disclosure, the prompt generated by the prompt generator 500 includes instructions to the LLM to annotate the generated description so that text portions that are, involve, and/or include unsubstantiated information are indicated, and to format the annotations in a way that can be recognized by a deterministic parser (e.g., a parser of the text-editor 550 or other text processing software). The parser may process the generated description before the description is presented, for example for display on a user device.

The prompt generator 500 may obtain a set of one or more object attributes to be included in a generated description for an object. The prompt generator 500 performs operations to generate a prompt to a LLM to generate the object description, where the prompt includes the object attribute(s) that should be included in the generated description.

The prompt generator 500 may obtain the object attribute(s) in various ways. For example, the set of object attributes may be received as input from the user device (e.g., by a user manually inputting the set of object attributes). In another example, the set of object attributes may be obtained from the object database 560 (e.g., the platform may perform operations to automatically generate an object description for any object in the object database 560 that does not have an associated object description; or a user may select an option to generate an object description for one or more objects without providing any object attributes). In another example, at least one object attribute may be partly received from the user device and at least another one object attribute may be obtained from the object database 560 (e.g., the user may manually input an identification of the object (such as object name, identification number, etc.) and the inputted identification may be used to query the object database 560 to obtain additional object attribute(s)).

In some examples, it may be sufficient for the prompt generator 500 to obtain a minimum of one object attribute (e.g., an object name, an object class, etc.) that is sufficiently descriptive to be understandable by the LLM. For example, it may be sufficient for the prompt generator 500 to obtain an object name such as "A sunny day in winter" or an object class such as "A pedestrian". In some examples, there may be no limit to the number of object attributes that can be objected by the prompt generator 500 for an object; however, there may be a limit to the number of object attributes that the prompt generator 500 can include in a generated prompt, for example due to a limit in the number of tokens that the LLM can accept in a prompt. In such cases, the prompt generator 500 may select a subset of the obtained object attributes to be the object attributes that are included in the prompt. For example, object attribute(s) received from the user device may take priority to be included in the prompt over object attribute(s) obtained from the object database 560. In another example, if the object attributes have category labels, the prompt generator 500 may follow defined rules to prioritize certain categories of attributes for inclusion in the prompt. For example, an object attribute in the category [object name] may be prioritized over an object attribute in the category [color]. In another example, different object attributes may be assigned relative priorities (which may be manually assigned by a user, or may be automatically assigned by the platform, etc.) and the object attributes having highest priority are selected by the prompt generator 500 to be included in the generated prompt to the LLM.

Having obtained the object attribute(s) to include in the prompt (and optionally having selected a subset of the obtained object attributes to include in the prompt), the prompt generator 500 generates the prompt to the LLM. The prompt generator 500 may for example, format the object attribute(s) into a structured list (and may list the object attribute(s) with the attribute category, if available) and insert instructions to the LLM to instruct the LLM to generate an object description based on the listed object attribute(s). The prompt generator 500 may insert instructions for the LLM to annotate any portions of the generated description that are, involve, and/or include unsubstantiated information. The inserted instructions may also provide a defined format that the LLM should use to indicate any portions of text that are, involve, and/or include unsubstantiated information.

For example, the prompt generator 500 may obtain the following object attributes for an object having the object attribute "lobster handbag" in the category [object name], and additional object attributes "leather", "fun", "birthday present", "owned by Ann" having no category label. The prompt generator 500 may format these object attributes into a list and insert instructions to the LLM to generate the following example prompt (example 1):

Generate a description for the following object. Add in areas where I can fill in the blanks for details you don't know about. For example, if you don't know the color just put [INSERT COLOR HERE]
Object name: lobster handbag
Object attributes: leather, fun, birthday present, owned by Ann The example prompt of example 1 may be considered to have several main parts. First, there are instructions to the LLM to generate an object description and additionally instructions to annotate, according to a defined format, any portion of the generated description that is, involves, and/or includes unsubstantiated information. This is followed by a separator (in this case, multiple asterisks) and then the one or more object attributes to be included in the generated description.

The generated prompt may be tokenized (by the prompt generator 500 or by a tokenization module of the platform) and the tokens may be included in an API call to the LLM. Alternatively or additionally, the prompt may be sent directly by API call to the LLM and tokenization may occur within the LLM itself or at a remote system at which the LLM is implemented. The generated description may then be received by the LLM. For example, the generated description for the prompt of example 1 may be (example 2):

Ann has a lobster handbag that is made of leather, which she got as a birthday present from [INSERT GIFTER HERE]. It is fun to use!

Notably, because the generated prompt includes instructions to annotate any portion of the generated description that is, involves, and/or includes unsubstantiated information according to the defined format, the generated description uses the annotation [INSERT GIFTER HERE] (i.e. a defined format of the form "[INSERT"+relevant noun+ "HERE]") instead of introducing potentially inaccurate information such as "her friend".

Example 1 shows a relatively simple prompt that may be generated by the prompt generator 500, in accordance with examples of the present disclosure. In another example, the prompt generator may insert a predefined sequence of instructions preceding the formatted list of object attribute(s). A lengthier sequence of instructions may be useful to prompt the LLM to generate an object description according to a certain style or format. For example, the prompt generator 500 may generate the following prompt (example 3):

Follow these instructions in priority order:
1. Use the below information to write a product description.
2. Write in the style of a luxury brand selling premium products.
3. Use a sophisticated and exclusive tone of voice. Choose words that are more complex and literary. Use metaphors and vocabulary that allude to the world of art, literature, or fashion.
4. Don't invent anything.
5. Add in areas where I can fill in the blanks for details you don't know about. For example, if you don't know the color just put [INSERT COLOR HERE].
6. Don't go over 100 words.
Product name: Silver coffee table
Features:—modern
    built-in storage
    minimalist design
    accent piece In example 3, the sequence of instructions includes step 5 that instructs the LLM to identify and annotate any portion of the generated text that is, involves, and/or includes unsubstantiated information using a specified annotation syntax. In particular, step 5 provides an example to indicate to the LLM what the defined format of the annotation should be. Thus, step 5 may be an example of how one-shot training for identifying and annotating unsubstantiated information can be included in the instructions inserted into the prompt. Additional, similar examples may be included in the instructions to provide few-shot training to indicate to the LLM the defined format that should be used to indicate the text portions that are, involve, and/or include unsubstantiated information in the generated text. Providing one- or few-shot training in the prompt to the LLM may be optional.

In some examples, the inserted instructions may include one or a few examples of what the generated description should look like with annotations to indicate text portions that are, involve, and/or include unsubstantiated information. For example, the instructions in example 3 may additionally include the following step (example 4):

7. Here are some examples to follow:
Example 1: Product name-Lobster handbag
Features—leather, fun, cheap
Generated description—This lobster handbag is made of leather, fun to use and easy on your wallet, plus it comes in [INSERT COLOR HERE].
Example 2: Product name—Large vase
Features—classic, luxury
Generated description—This vase gives your home that classic look. Its design is luxurious and it is made of [INSERT MATERIAL HERE]. Choose any color from [INSERT COLOR HERE].

In example 4, the examples included in step 7 of the inserted instructions may be predefined (e.g., may be fixed text in the inserted instructions). Alternatively, the examples can be automatically generated using data from the object database 560. For example, the object database 560 may store the set of object attributes for each object as well as the object description (if available) for each object. The prompt generator 500 may select one or a few object descriptions and the associated set of object attributes from the object database 560, format the object attribute(s) and object description into the form of an example (according to defined rules, such as listing the object attributes followed by the object description and labelling this as an example), and insert the result as an example in the instructions to the LLM. For example, the prompt generator 500 may automatically select one or a few descriptions of objects randomly from the object database 560, may select descriptions of objects in a similar category as the target object for which the object description is to be generated, may select descriptions of objects found in a similar setting, may select descriptions of objects with similar attributes or categories of attributes, etc. If the object description to be generated is a sellable object description (e.g., a commercial product), the selected object description(s) may be product descriptions of other products belonging to the same account (e.g., sold by the same store), product descriptions of products having high sales, etc.

The generated description is received from the LLM and may be presented to a user device. For example, the platform may receive the generated description from the LLM as a response to an API call, and the platform may send data to the user device over a communication link (e.g., over a wireless network) to enable the description to be displayed on the user device (e.g., to be viewed in a UI provided by the text-editor 550).

The text-editor 550 may provide a UI that enables a user to review the generated description. The text-editor 550 may be locally accessible on a user device of the user (e.g., may be an application on a user device such as a desktop computer, smartphone, tablet, laptop, etc.) or may be an online service, provided by the platform, that is accessible to the user device via a communication link (e.g., over a wireless network) with the platform.

Figure 3A:
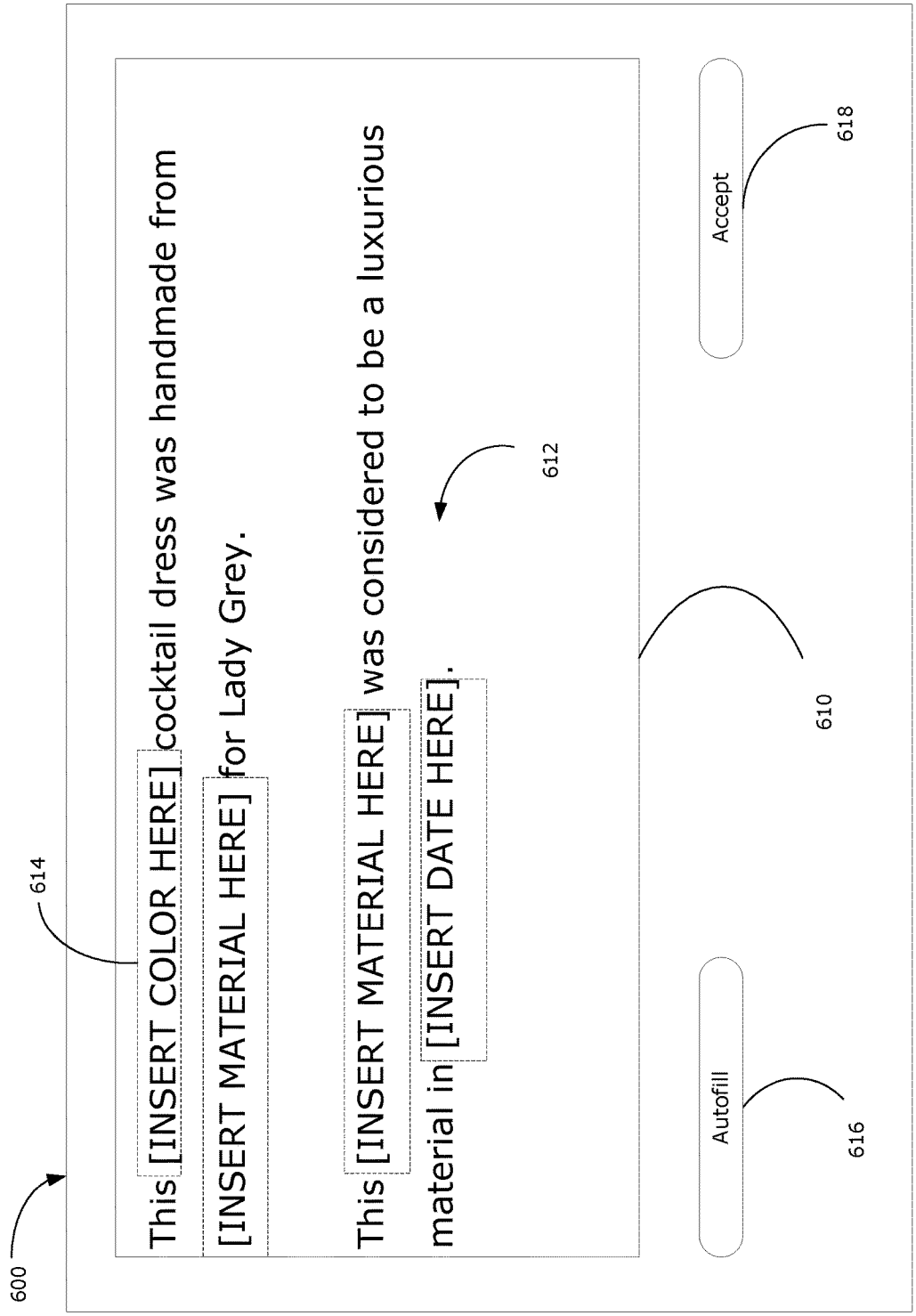
FIGS. 3A-3D are example UIs that may be provided in accordance with examples of the present disclosure.

FIG. 3A illustrates an example embodiment of a UI 600 that may be provided by the text-editor 550. The UI 600 may include a description field 610 in which the generated description 612 may be displayed. The text-editor 550 may parse the generated description 612 to identify any portions of text that have been annotated by the LLM according to the defined format to indicate unsubstantiated information. In this example, the generated description 612 includes portions annotated by the use of brackets ("[ ]") as well as the words "INSERT" and "HERE" to indicate unsubstantiated information (e.g., where the defined format is defined as having the form "[INSERT"+relevant noun+"HERE]" in the prompt generated by the prompt generator 500). The defined format may be the use of brackets and/or the defined format may include the use of defined text, for example. The text-editor 550 may determine that the identified portion(s) of text require user attention (e.g., user input).

In the example of FIG. 3A, the text-editor 550 may visually indicate the identified portion(s) of text, for example by applying a highlight 614 (indicated by the dashed box) to the identified portions of text. Other formatting may be used. The text-editor 550 may additionally or alternatively modify the annotation(s) in the generated text. For example, the defined format may be "[" followed by relevant noun followed by "]", with a view to minimizing the length (e.g., number of tokens) of the input to and/or output from an LLM. Additionally or alternatively, the text-editor 550 may rewrite the identified portions of text to, for example, improve ease of use and/or readability (e.g. replacing "[color]" in the generated text with "INSERT COLOR HERE"). A user may select an indicated portion of text (e.g., using a mouse, keyboard or touchscreen) and, with the portion of text selected, may provide input (e.g., using a keyboard, microphone, etc.) to provide the unsubstantiated information.

In some examples, only those specific portions of text that are, involve, and/or include unsubstantiated information may be modifiable by user input and the user may navigate to each portion in turn (e.g., using tab button) without risk of inadvertently editing other portions of the generated description 612. If there are multiple portions of text requiring the user to supply the same information (e.g., multiple [INSERT MATERIAL HERE] portions, as in the example shown), user input into one portion can be propagated to fill in all portions requiring the same information without the user having to input this same information multiple times. For example, the text-editor 550 may parse the annotations in the generated description 612 and identify the two [INSERT MATERIAL HERE] portions of text as requiring the same information (e.g., based on the annotation having the same text string). Then, when user input is received that provides an inputted text string for one portion, the text-editor 550 may automatically provide the same text string to the other portion.

The text-editor 550 may have functionality to assist in completion of the generated description 612 by automatically filling in or otherwise providing the unsubstantiated information or by automatically providing selectable options for filling in or otherwise providing the unsubstantiated information. The UI 600 may as in the example shown in FIG. 3A, include an autofill option 616 that may be selected to cause the text-editor 550 to assist in completion of the generated description 612, as will be discussed further below with respect to FIGS. 3C and 3D.

The UI 600 may include an accept option 618 that may be selected to confirm that the generated description 612 (which may have been modified by the user, for example to provide the unsubstantiated information) is approved. Selection of the accept option 618 may cause the generated description 612 (with the user modifications that have been made) to be saved by the platform. For example, if the generated description 612 is for an object in the object database 560, the generated description 612 may be linked to the object and stored in the object database 560. If the generated description 612 is to be published on an online page (e.g., a webpage that is managed by the platform), the generated description 612 may be uploaded to the online page in response to receiving an indication of user approval (e.g., in response to selection of the accept option 618). In some examples, the accept option 618 may not be selectable (e.g., may be absent or may be greyed out) until each identified portion requiring user attention has been provided with the required information.

Figure 3B:
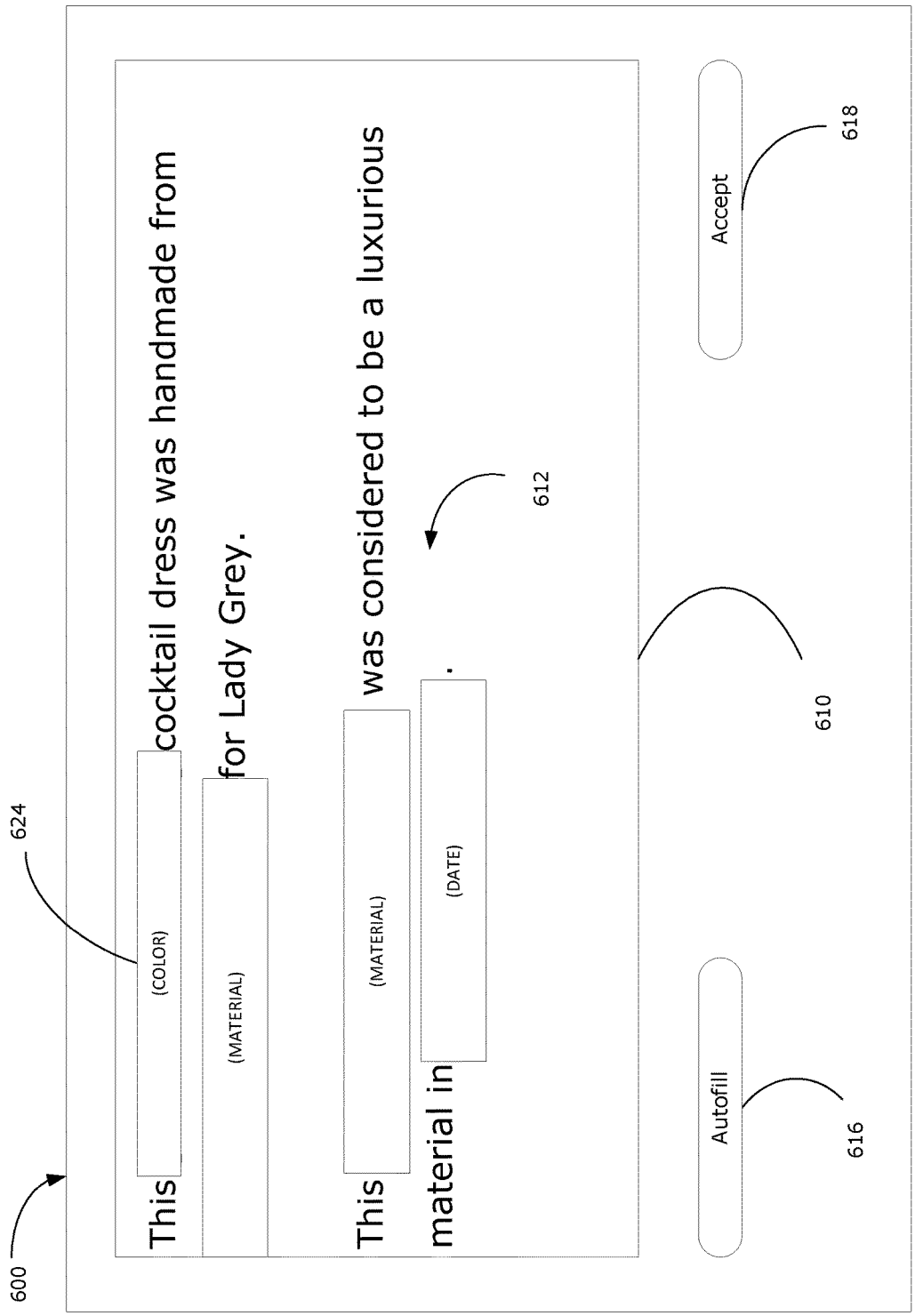

FIG. 3B illustrates another example embodiment of the UI 600 that may be provided by a text-editor 550 in accordance with examples of the present disclosure. The example of FIG. 3B is similar to FIG. 3A, except that the UI 600 may replace each identified portion of text with a text input field 624. Each text input field 624 may be labelled to indicate the information that cannot be substantiated (and that requires user input). The text-editor 550 may parse the annotation in the generated description 612 and extract from the annotation the text string indicating the unsubstantiated information. For example, the text-editor 550 may extract the text string "COLOR" from the annotation [INSERT COLOR HERE]. The UI 600 may replace the annotation [INSERT COLOR HERE] with a text input field 624 labelled with the extracted text string "COLOR", as shown in FIG. 3B. Other functionalities may be similar to that described above with respect to FIG. 3A.

Figure 3C:
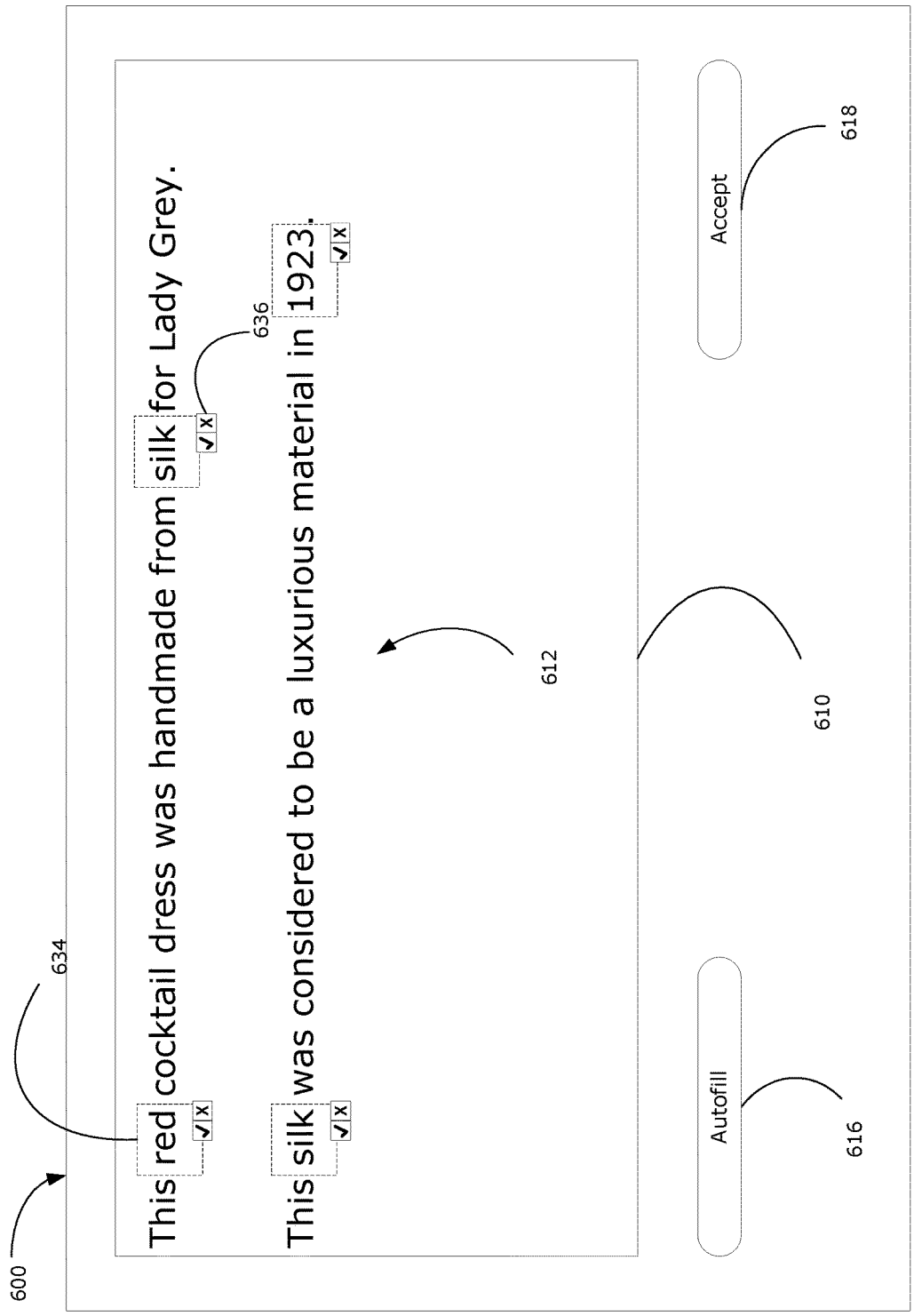

FIG. 3C illustrates another example embodiment of the UI 600 that may be provided by a text-editor 550 in accordance with examples of the present disclosure. The example of FIG. 3C may be the result of the text-editor autofilling the unsubstantiated information (e.g., in response to selection of the autofill option 616). In this example, the text-editor 550 may query the object database 560 to obtain object information to fill in or otherwise provide the unsubstantiated information. For example, the text-editor 550 may recognize the labels used in the annotations as being categories of object attributes. The text-editor 550 may also have information from the generated description 612 or from the prompt generator 500 to identify the object from the object database 560 (e.g., the prompt generator 500 may provide the object name or object identification number to the text-editor 550). The text-editor 550 may then generate a query to the object database 560 to extract the object attribute for the identified object and for the particular object attribute category of the unsubstantiated information. For example, if the annotation is [INSERT MATERIAL HERE] and the object name is "cocktail dress", the text-editor 550 may format this into a query to search the object database 560 for the object attribute in the category [material] belonging to the object having object name "cocktail dress". The response from the query may then be used by the text-editor 550 to automatically complete or otherwise provide the unsubstantiated information for each instance of the identified portion of text. In this example, the text-editor 550 has retrieved the object attribute "silk" and has provided this information to each instance of the identified portion of text [INSERT MATERIAL HERE]. In this example, the UI 600 still visually indicates (e.g., by applying a highlight 634) the autocompleted information to the user. The autocompleted text may be selectable and modifiable by a user, similar to the example of FIG. 3A. The UI 600 may additionally or alternatively provide selectable option(s) 636 for the user to confirm or reject the autocompleted information. FIG. 3C may thus illustrate an example where the generated description 612 is automatically provided with the required information.

Figure 3D:
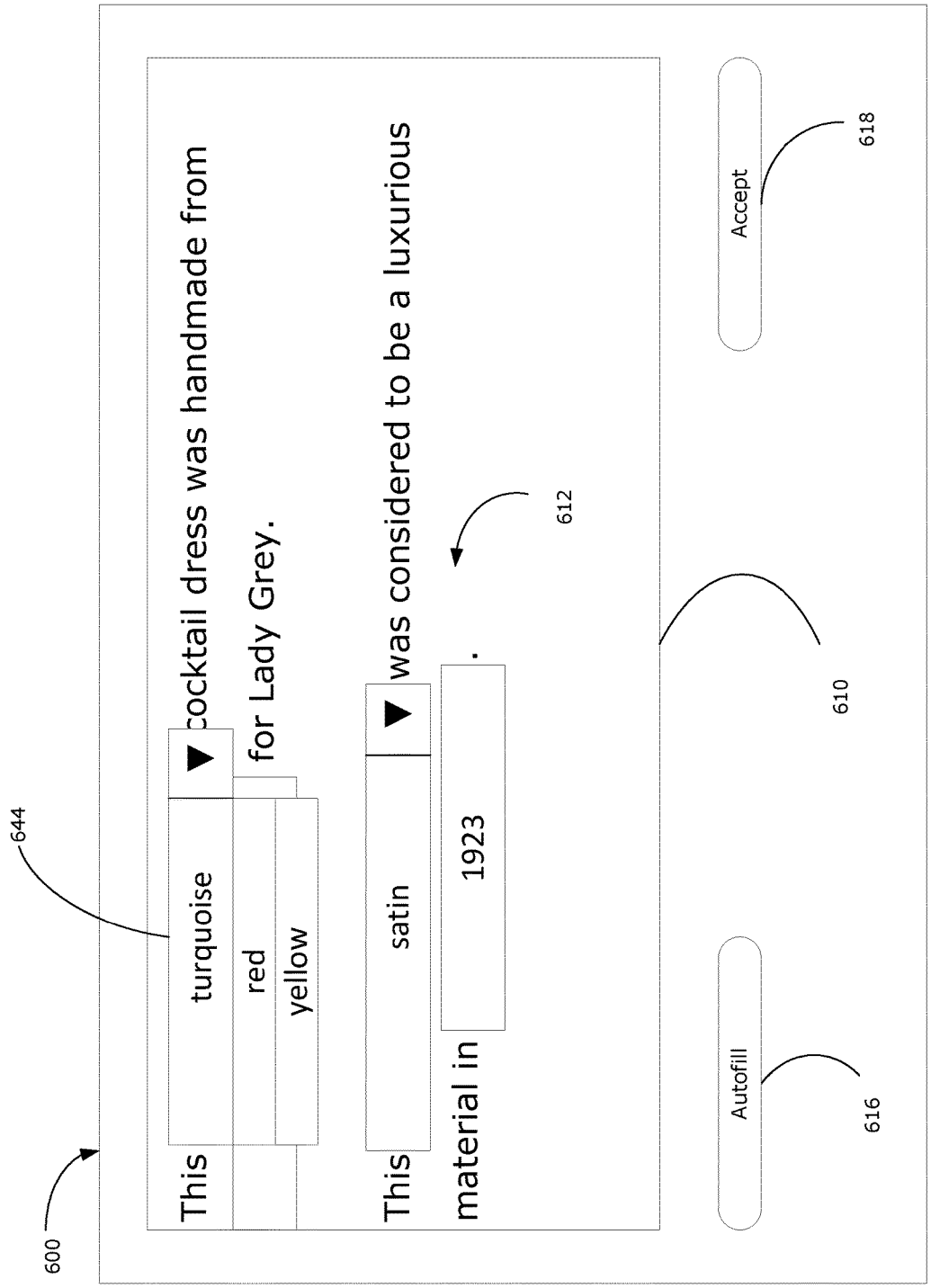

FIG. 3D illustrates another example embodiment of the UI 600 that may be provided by a text-editor 550 in accordance with examples of the present disclosure. The example of FIG. 3D may be similar to the example of FIG. 3C, however in this example the query to the object database 560 to obtain information to fill in or otherwise provide the unsubstantiated information may retrieve multiple values for a given object attribute (e.g., different possible colors). In this example, the UI 600 the UI may enable the user to select from among the multiple retrieved values, for example using a drop-down list 644. FIG. 3D may thus illustrate an example where the generated description 612 is semi-automatically provided with the required information.

In some examples, automatic or semi-automatic completion of the generated description 612 (e.g., as illustrated by the examples of FIGS. 6C and 6D) may be performed automatically by the text-editor 550 after the generated description 612 is received from the LLM, without requiring selection of the autofill option 616. Such an embodiment may further automate the generation of the object description and further improve efficiencies of the computing system and/or of the user interface by further reducing the need for user inputs.

It should be understood that the UI 600 is only exemplary and is not intended to be limiting. For example, the generated description received from the LLM may be presented in any suitable manner, using any suitable text-editor and/or in other formats. The generated description may be presented without requiring the use of any UI. For example, the generated description may be presented as audio output (e.g., the generated description may be converted to speech using a text-to-speech software).

Figure 4:
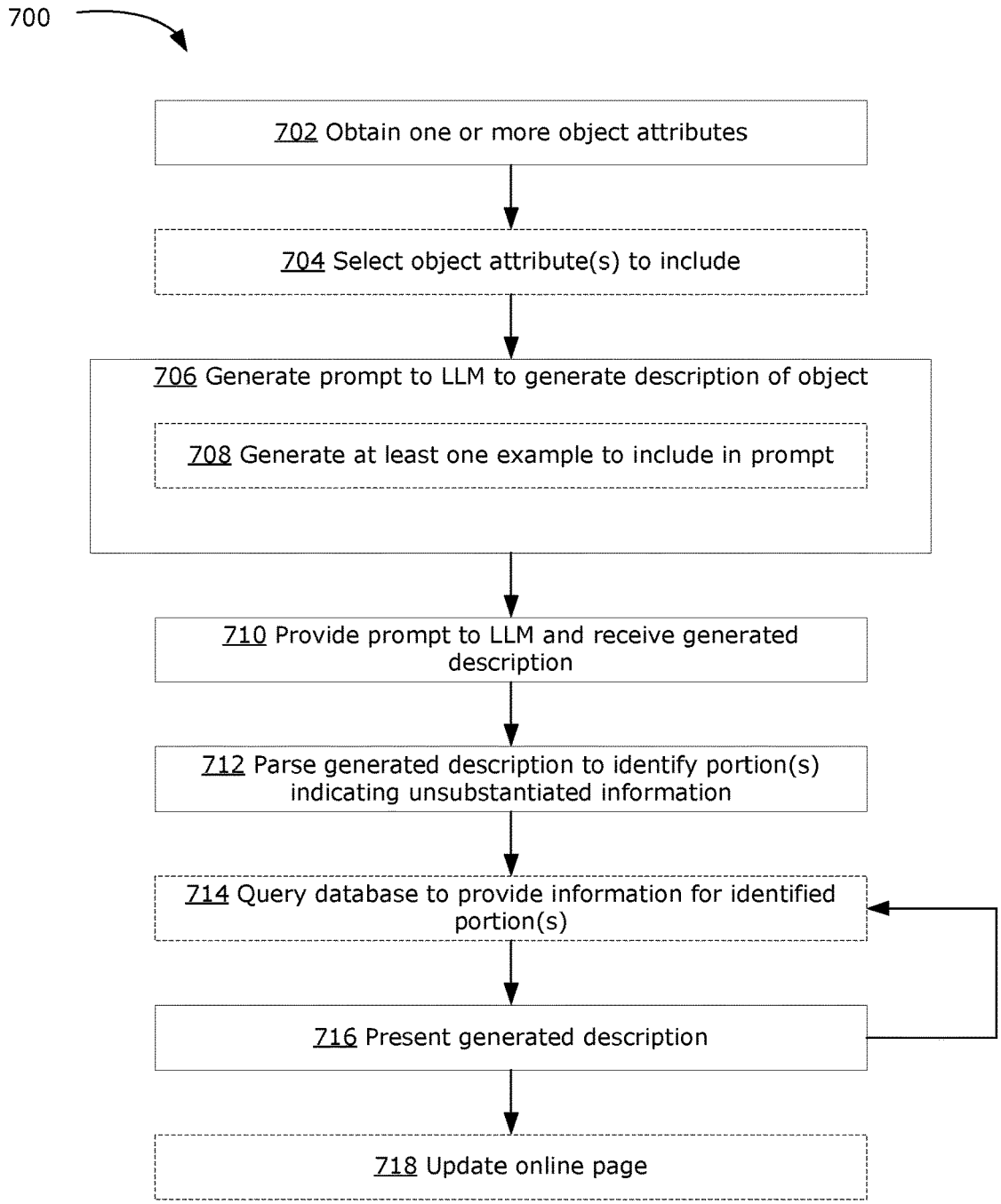
FIG. 4 is a flowchart illustrating an example method for prompting a LLM, in accordance with examples of the present disclosure.

FIG. 4 is a flowchart of an example method 700 which may be performed by a computing system, in accordance with examples of the present disclosure. For example, a processing unit of a computing system (e.g., the processor 402 of the computing system 400 of FIG. 2) may execute instructions (e.g., instructions of the prompt generator 500 and/or text-editor 550) to cause the computing system to carry out the example method 700. The method 700 may for example, be implemented by an online platform or a server.

At an operation 702, the prompt generator 500 obtains one or more object attributes for an object for which an object description is to be generated. In some embodiments, the object may be a product (e.g. for sale on an e-commerce store) and the object description may be a product description. As described above, the object attribute(s) may be obtained by being received from a user device and/or from an object database 560, for example.

Optionally, at an operation 704, the object attribute(s) to be included in the object description may be selected. The operation 704 may be performed if, for example, the number of object attributes obtained for an object exceeds a defined maximum number (e.g., over 100 object attributes). As described above, selection of the object attribute(s) to be included may be based on relative priorities of different attributes and/or different attribute categories.

At an operation 706, a prompt to a LLM is generated (e.g., by the prompt generator 500). The LLM (which may be a generative pre-trained transformer LLM, such as GPT-3 or ChatGPT) is prompted to generate a description of the object. The generated prompt includes the object attribute(s) obtained at the operation 702 (and optionally selected at the operation 704) to include in the generated description. The generated prompt also includes an instruction for the LM to annotate any portions of the generated description that are, involve, or include unsubstantiated information according to a defined format (e.g., using brackets "[ ]" and annotated with text indicating the category of information (e.g., the category of object attribute) that cannot be substantiated). In some examples, the prompt to the LLM may include at least one example of an annotation according to the defined format. The included example may be predefined and fixed, or may be generated at run-time (i.e., at the time that the prompt is generated) using optional operation 708.

At the optional operation 708, at least one example may be generated to be included in the generated prompt. The operation 708 may include retrieving, from a database (e.g., the object database 560) an example object description and a set of example object attributes for an example object. As previously described, the example object may be randomly selected from the object database 560 or may be selected according to some criterion such as similarity to the object for which the object description is to be generated, being associated with the same user or account as the object for which the object description is to be generated, being high-ranked in online searches (e.g., based on search analytics tracked by the computing system), being high-ranked in sales (e.g., based on sales data tracked by the computing system), etc. The retrieved example object description may be modified by replacing one selected example object attribute in the example object description with an annotation in accordance with the defined format. The set of retrieved example object attributes may be modified by removing the one selected example object attribute that was removed from the example object description. Then the example may be generated using the modified set of example object attributes and the modified example object description and the generated example may be included in the prompt to the LLM. Additionally or alternatively, one or more examples may be generated using an LLM (e.g. separately from other uses of an LLM in this method).

Regardless of how the operation 706 is carried out, following the operation 706 the method 700 proceeds to an operation 710.

At the operation 710, the generated prompt is provided to the LLM (e.g., via an API call to a remote LLM). For example, the generated prompt may be converted to a set of tokens (e.g., using a suitable tokenization algorithm or software). For example, the prompt may be segmented into a sequence of text segments and each text segment may be converted to a NLP token (e.g., using a token lookup) while preserving the sequential order of the text segments. Then the set of tokens may be provided to the LLM (e.g., via an API call) in sequential order. A generated description may then be received in response to the API call. Additionally or alternatively, the generated prompt may be provided to the LLM as-is (e.g., as a sequence of text without the segmentation described above). Tokenization of the prompt may be performed by the LLM or by a remote system.

At an operation 712, the generated description is parsed (e.g., by the text-editor 550) to identify, based on the defined format, one or more annotated portions indicating unsubstantiated information. Parsing may include identifying the portion(s) indicating unsubstantiated information and may also include identifying the object attribute that cannot be substantiated (e.g., the annotation may be parsed to identify a text string or label indicating the category of object attribute that cannot be substantiated).

Optionally, at an operation 714, a database (e.g., the object database 560) may be queried to enable automatic or semi-automatic completion of the identified portion(s) of the generated description. For example, an unsubstantiated object attribute may be identified by parsing a given one annotated portion in the generated description. The database may be queried to search for the unsubstantiated object attribute. The generated description may then be modified by replacing the given one annotated portion with a found object attribute received in a response to the query.

At an operation 716, the generated description is presented for display via a user device. If operation 714 was performed, then the modified generated description may be presented. For example, the generated description may be presented in a UI (e.g., the UI 600 of any one of FIGS. 6A-6D). The UI may enable at least one of the identified annotated portions to be modifiable. In some examples, the UI may include an input field (e.g., text input field) for receiving user input to edit one of the identified annotated portions. In some examples, two or more annotated portions in the generated description may be identified as requiring a same user input (e.g., the two or more portions are identified as requiring the same category of object attribute). User input may be received in one input field for one of the two or more portions, then the two or more portions may be automatically updated with information inputted in the one input field.

Optionally, responsive to a received command to autofill the generated description (e.g., responsive to user selection of an autofill option), the method 700 and return to the operation 714 to modify the generated description using data queried from a database.

In some examples, if, at the operation 714, there is a plurality of found object attributes received in the response to the query, the generated description may be modified by replacing the corresponding one annotated portion with a UI element (e.g., drop-down list) for selecting one of the plurality of found object attributes.

Optionally, at an operation 718, the generated description may be used to update an online page. For example, the generated description may be used to update a searchable online database of a collection of objects (e.g., objects in a museum, books in a library, etc.). In another example, if the method 700 is performed to generate a product description for a product (e.g., a product that is purchasable from an online store), the generated description may be a product description that may be used to update a product page related to the product. In some examples, the generated description may be updated to update the page responsive to a received indication of approval (e.g., responsive to user selection of an option to accept the generated description).

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 5:
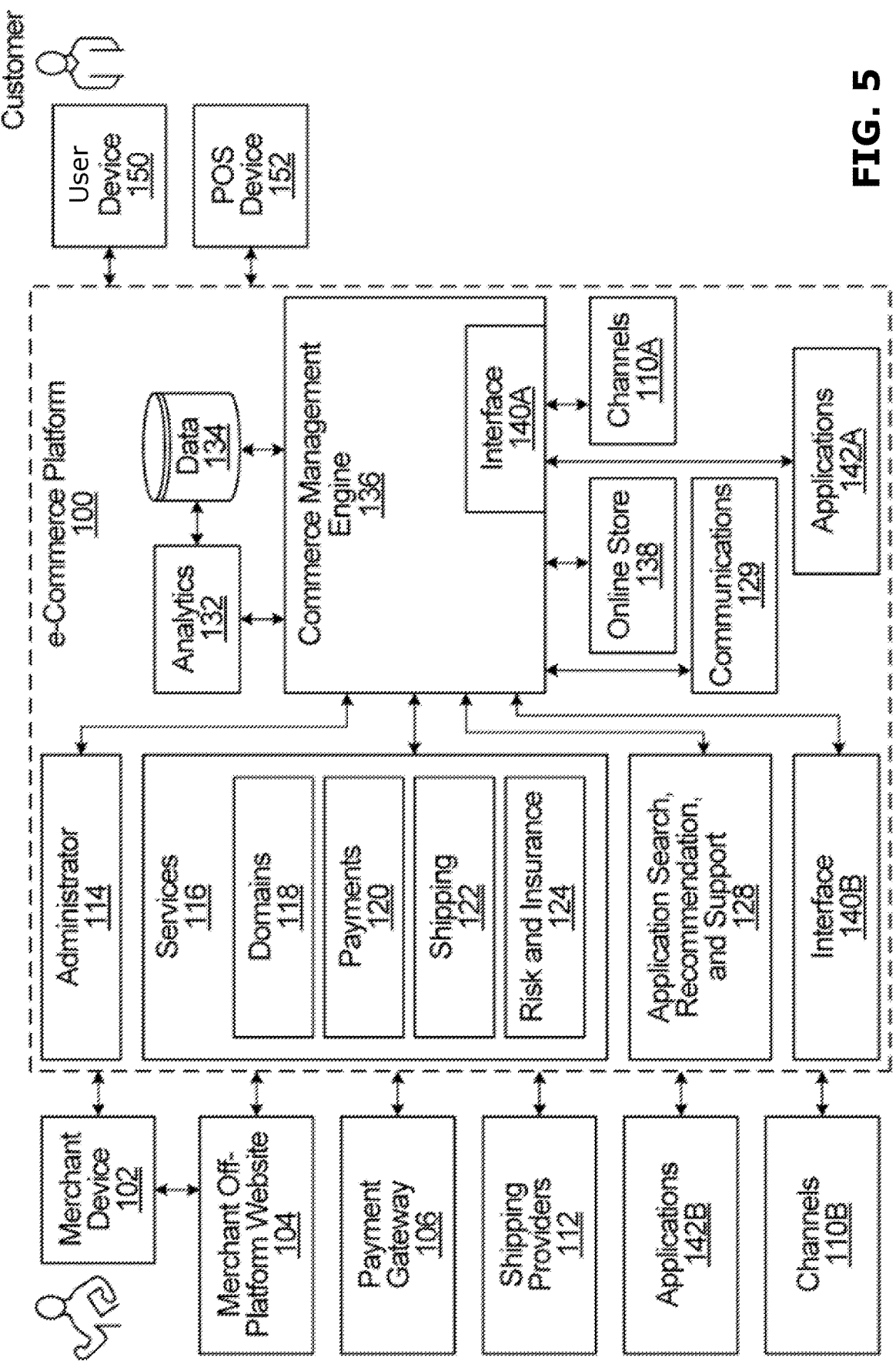
FIG. 5 is a block diagram of an example e-commerce platform, which may be an example implementation of the examples disclosed herein.

FIG. 5 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may in some embodiments, may additionally or alternatively, be provided by one or more providers/entities.

In the example of FIG. 5, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 6:
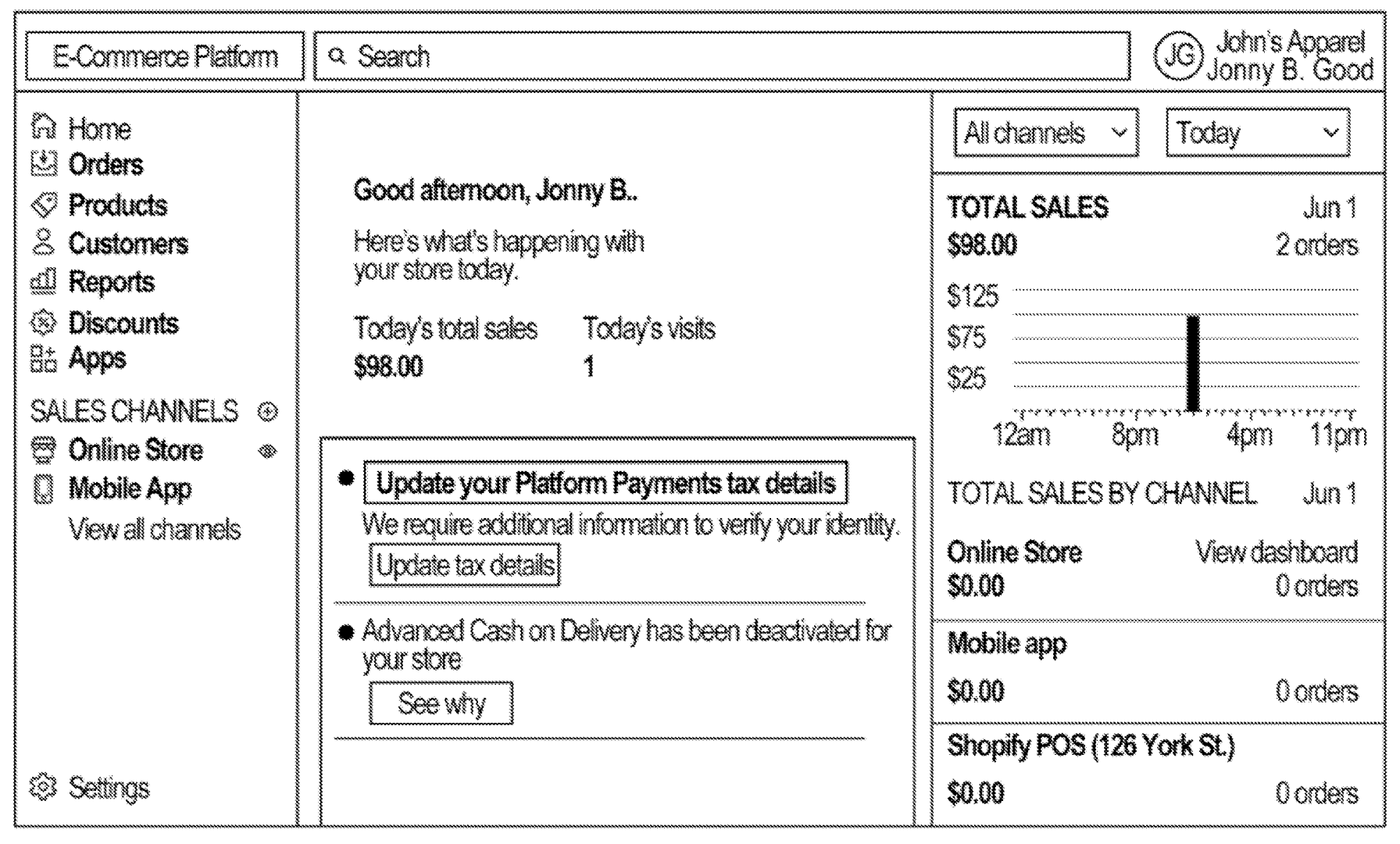

FIG. 6 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalogue, managing orders, and/or the like. In some embodiments, the merchant may be able to access the different sections of the administrator 114 by using a sidebar, such as the one shown on FIG. 3. Sections of the administrator 114 may include various interfaces for accessing and managing core aspects of a merchant's business, including orders, products, customers, available reports and discounts. The administrator 114 may additionally or alternatively, include interfaces for managing sales channels for a store including the online store 138, mobile application(s) made available to customers for accessing the store (Mobile App), POS devices, and/or a buy button. The administrator 114 may additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 2, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales) (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples, the applications 142A-B may include an application that enables a user interface (UI) to be displayed on the customer device 150. In particular, the e-commerce platform 100 may provide functionality to enable content associated with an online store 138 to be displayed on the customer device 150 via a UI.

The methods and systems (e.g., prompt generator 500 and/or text-editor 550) as disclosed herein may be provided by the e-commerce platform as an online service to enable a user to conveniently and efficiently generate an object description (e.g., for generating a product description for a product page or a product catalog). It should be understood that the methods and systems disclosed herein may be provided as an online service by any other online platform (e.g., SaaS platform) without being limited to the e-commerce platform. The online platform may provide applications that serve as an interface layer between the user and the LLM, to enable the user to more effectively and efficiently make use of the LLM to generate an object description.

Examples of the present disclosure may enable a LLM to be prompted to generate an object description that includes indications of any portions of text that are, involve, and/or include unsubstantiated information. The indications may be annotated according to a defined format that may be parsed by a parser, to enable a user to readily identify any portions of text that may require their attention or review. Examples of the present disclosure may enable portions that are, involve, and/or include unsubstantiated information in the generated description to be automatically or semi-automatically completed, which may provide for greater efficiency and/or reduced need for user inputs.

Although the present disclosure has described a LLM in various examples, it should be understood that the LLM may be any suitable language model (e.g., including LLMs such as GPT-3 or ChatGPT, as well as other language models such as BART, among others). Additionally, it should be understood that the present disclosure is not limited to any particular language. Although English has been used in various examples, the present disclosure may be equally applicable to other human languages.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system comprising:
    a processing unit configured to execute computer-readable instructions to cause the system to:
        generate a prompt to a large language model (LLM) to generate a description of an object, the prompt including one or more object attributes to include in the generated description, and also including an instruction for the LLM to annotate, according to a defined format, any portions of the generated description that include unsubstantiated information;
        provide the prompt to the LLM;
    causing the LLM to generate the generated description;
    receive the generated description;
        parse the generated description to identify, based on the defined format, one or more annotated portions indicating unsubstantiated information; and
        present the generated description for display via a user device.

2. The system of claim 1, wherein the generated description is presented in a user interface (UI) in which at least one of the identified one or more annotated portions is modifiable.

3. The system of claim 2, wherein the processing unit is configured to execute computer-readable instructions to further cause the system to, prior to presenting the UI:
    identify, for a given one annotated portion in the generated description, an unsubstantiated object attribute;
    query a database to search for the unsubstantiated object attribute;
    modify the generated description by replacing the given one annotated portion with a found object attribute received in a response to the query; and
    present the modified generated description in the UI.

4. The system of claim 3, wherein there is a plurality of found object attributes received in the response to the query, and wherein the generated description is modified by replacing the given one annotated portion with a UI element for selecting one of the plurality of found object attributes.

5. The system of claim 2, wherein the UI further includes an input field for receiving user input to edit the one or more annotated portions.

6. The system of claim 5, wherein the processing unit is configured to execute computer-readable instructions to further cause the system to:
    identify at least two annotated portions in the generated description requiring a same user input;
    provide one input field for receiving user input to edit the at least two annotated portions; and
    update the at least two annotated portions with information inputted in the one input field.

7. The system of claim 1, wherein the prompt to the LLM includes at least one example of an annotation according to the defined format.

8. The system of claim 7, wherein the at least one example is generated by:
    retrieving, from a database of the system, an example object description and a set of example object attributes for an example object;
    modifying the example object description by replacing one selected example object attribute in the example object description with an annotation in accordance with the defined format;
    modifying the set of example object attributes by removing the one selected example object attribute; and generating the at least one example to include the modified set of example object attributes and the modified example object description.

9. The system of claim 1, wherein the processing unit is configured to execute computer-readable instructions to further cause the system to provide the prompt to the LLM as a set of tokens.

10. The system of claim 1, wherein the LLM is a trained generative LLM.

11. The system of claim 1, wherein the prompt to the LLM includes instructions to generate a product description for a product, and the generated description is the generated product description.

12. The system of claim 11, wherein the generated product description is used to update a product page related to the product.

13. The system of claim 12, wherein the generated product description is used to update the product page related to the product responsive to an approval received from a user device.

14. A method comprising:
generating a prompt to a large language model (LLM) to generate a description of an object, the prompt including one or more object attributes to include in the generated description, and also including an instruction for the LLM to annotate, according to a defined format, any portions of the generated description that include unsubstantiated information;
providing the prompt to the LLM;
causing the LLM to generate the generated description;
receiving the generated description;
parsing the generated description to identify, based on the defined format, one or more annotated portions indicating unsubstantiated information; and
presenting the generated description for display via a user device.

15. The method of claim 14, wherein the generated description is presented in a user interface (UI) in which at least one of the identified one or more annotated portions is modifiable.

16. The method of claim 15, further comprising, prior to presenting the UI:
identifying, for a given one annotated portion in the generated description, an unsubstantiated object attribute;
querying a database to search for the unsubstantiated object attribute;
modifying the generated description by replacing the given one annotated portion with a found object attribute received in a response to the query; and
presenting the modified generated description in the UI.

17. The method of claim 16, wherein there is a plurality of found object attributes received in the response to the query, and wherein the generated description is modified by replacing the given one annotated portion with a UI element for selecting one of the plurality of found object attributes.

18. The method of claim 17, further comprising:
identifying at least two annotated portions in the generated description requiring a same user input;
providing one input field for receiving user input to edit the at least two annotated portions; and
updating the at least two annotated portions with information inputted in the one input field.

19. The method of claim 14, wherein the prompt to the LLM includes at least one example of an annotation according to the defined format.

20. The method of claim 19, wherein the at least one example is generated by:
retrieving, from a database, an example object description and a set of example object attributes for an example object;
modifying the example object description by replacing one selected example object attribute in the example object description with an annotation in accordance with the defined format;
modifying the set of example object attributes by removing the one selected example object attribute; and
generating the at least one example to include the modified set of example object attributes and the modified example object description.

21. The method of claim 14, wherein the prompt to the LLM includes instructions to generate a product description for a product, and the generated description is the generated product description.

22. The method of claim 21, wherein the generated product description is used to update a product page related to the product.

23. The method of claim 22, wherein the generated product description is used to update the product page related to the product responsive to an approval received from a user device.

24. A non-transitory computer readable medium storing computer-executable instructions thereon, wherein the instructions are executable by a processing unit of a system to cause the system to:
generate a prompt to a large language model (LLM) to generate a description of an object, the prompt including one or more object attributes to include in the generated description, and also including an instruction for the LLM to annotate, according to a defined format, any portions of the generated description that include unsubstantiated information;
provide the prompt to the LLM;
causing the LLM to generate the generated description; and
receive the generated description;
parse the generated description to identify, based on the defined format, one or more annotated portions indicating unsubstantiated information; and
present the generated description for display via a user device.

* * * * *